(12) United States Patent
Saito et al.

(10) Patent No.: US 6,984,440 B2
(45) Date of Patent: Jan. 10, 2006

(54) DECORATIVE SHEET AND METHOD FOR PRODUCING THE SAME

(75) Inventors: Yoshio Saito, Otsu (JP); Tsuyoshi Akai, Moriyama (JP)

(73) Assignee: C.I. Kasei Company, Limited, Tokyo (JP)

(*) Notice: Subject to any disclaimer, the term of this patent is extended or adjusted under 35 U.S.C. 154(b) by 251 days.

(21) Appl. No.: 10/071,963

(22) Filed: Feb. 7, 2002

(65) Prior Publication Data
US 2004/0202828 A1 Oct. 14, 2004

(51) Int. Cl.
*B32B 23/02* (2006.01)

(52) U.S. Cl. .................. 428/195.1; 141/204; 141/207; 141/32.78; 141/32.79; 141/401; 141/424.6; 141/500

(58) Field of Classification Search ............... 428/141, 428/195.1, 204, 207, 32.78, 32.79, 40.1, 428/424.6, 500
See application file for complete search history.

(56) References Cited

U.S. PATENT DOCUMENTS

| | | | | |
|---|---|---|---|---|
| 5,019,440 A | * | 5/1991 | Ogasawara et al. | 428/195.1 |
| 5,114,789 A | * | 5/1992 | Reafler | 428/328 |
| 5,340,907 A | * | 8/1994 | Yau et al. | 528/274 |
| 5,656,359 A | * | 8/1997 | Hirota et al. | 428/195.1 |
| 5,763,048 A | * | 6/1998 | Takahashi | 428/147 |
| 6,326,086 B1 | * | 12/2001 | Mori et al. | 428/516 |
| 6,364,992 B1 | * | 4/2002 | Nambu et al. | 156/277 |

FOREIGN PATENT DOCUMENTS

| | | | |
|---|---|---|---|
| EP | 0875374 | * | 4/1998 |
| JP | 60-155429 A | | 8/1985 |
| JP | 9-085915 A | | 3/1997 |
| JP | 10-244643 A | | 9/1998 |
| JP | 11-000979 A | | 1/1999 |
| JP | 11-010817 A | | 1/1999 |
| JP | 11-034269 A | | 2/1999 |
| JP | 11-034270 A | | 2/1999 |
| JP | 11-179868 A | | 7/1999 |
| JP | 2001-047582 A | | 2/2001 |

* cited by examiner

*Primary Examiner*—Rena Dye
*Assistant Examiner*—Tamra L. Dicus
(74) *Attorney, Agent, or Firm*—Frishauf, Holtz, Goodman & Chick, P.C.

(57) ABSTRACT

A decorative sheet with good design properties and with superior moldability, without using a vinyl chloride resin, comprises a base material layer formed of a coloring resin material including an amorphous polyethylene terephthalate type resin as a main component; a print pattern layer formed on one surface of said base material layer and formed of a coloring ink comprising a binder including a copolymer of vinyl chloride and vinyl acetate as a main component; a transparent layer laminated on said print pattern layer and formed of a resin material including a transparent amorphous polyethylene terephthalate type resin as a main component; and a surface protective layer laminated on said transparent layer, which is made of a hard and transparent acryl type resin. The surface protective layer is constituted of a transfer protective layer of a transfer foil.

3 Claims, 3 Drawing Sheets

DECORATIVE SHEET AND METHOD FOR PRODUCING THE SAME

BACKGROUND OF THE INVENTION

1. Field of the Invention

The present invention relates to a polyester-type resin decorative sheet which has a design and exhibits superior formability, and relates to a method for producing the same.

2. Description of Relayed Art

As a resin decorative sheet having a design, a vinyl chloride resin is commonly employed. In order to produce the decorative sheets made of vinyl chloride, an embossing finish method in which a pattern is formed by passing a vinyl chloride sheet between a roll patterned on the surface and a pressure roll, a method for directly printing a pattern on the surface of the vinyl chloride sheet, a method for laminating a pattern-printed film on the surface of the vinyl chloride sheet, or the like has been utilized.

In the case where various decorative sheets having various patterns are produced in a small batch, in many cases, the film laminating method is utilized. In this case, for example, as described in Japanese Unexamined Patent Application, First Publication No. Sho-60-155429, a method comprising the steps of extruding a vinyl chloride sheet, immediately after that laminating a film having a pattern, and pressing the film onto the sheet by passing them between rolls, or the like has been utilized.

However, in recent years, it has been desired to produce a decorative sheet not by using a vinyl chloride resin but by using the other resin raw materials as a raw material of a sheet material, and therefore, decorative sheets using resin raw materials other than a vinyl chloride resin have been desired.

BRIEF SUMMARY OF THE INVENTION

Therefore, in order to overcome the problems described above, the present invention has as an object to provide a polyester-type resin decorative sheet having good design properties and exhibiting superior formability without using a vinyl chloride resin, as well as has as an object to provide a method for producing the decorative sheet.

In the following, means for attaining the objects described above will be explained with reference to drawings corresponding to modes for carrying out the present invention. A decorative sheet 1 according to the present invention is characterized by comprising a base material layer 2 formed of a colored resin material including an amorphous polyethylene terephthalate type resin as a main component; a print pattern layer 3 formed on one surface 2a of the base material layer 2 and consisting of a coloring ink comprising a binder including a copolymer of vinyl chloride and vinyl acetate; a transparent layer 4 laminated on the print pattern layer 3 and formed of a resin material including a transparent amorphous polyethylene terephthalate type resin as a main component; and a surface protective layer 6 laminated on the transparent layer 4, which is hard and transparent.

The surface protective layer 6 described above may be constituted of a transfer protective layer 10 of a transfer foil 7, and in addition, may also be constituted of a hard coating film 15.

Furthermore, on the surface of the surface protective layer 6, a masking film may be spread.

In addition, a method for producing a decorative sheet 1 according to the present invention is characterized by comprising the steps of forming a pattern on one surface 2a of a base material film 2' formed of a colored resin raw material having an amorphous polyethylene terephthalate type resin as a main component, by using a coloring ink comprising a binder including a copolymer of vinyl chloride and vinyl acetate as a main component, thus forming a print pattern layer 3; supplying the base material film 2' between a first pair of rolls 21 which are generally horizontally provided in a parallel manner; supplying a transparent resin film 4' obtained by extruding a transparent resin raw material including an amorphous polyethylene terephthalate type resin as a main component, between one roll 23A of the first pair of rolls 21 and the surface of the print pattern layer 3 of the base material film 2' supplied from another roll 23B opposed to the roll 23A, to laminate and spread the transparent resin film 4' on the print pattern layer 3 of the base material film 2', thus forming a base material sheet 5 in which a transparent layer 4 is formed on the print pattern layer 3 of the base material film 2'; supplying the base material sheet 5 between a second pair of rolls 25; and supplying a surface protective film 7 or 15 which is hard and transparent between one roll 26A of the second pair of rolls 25 and the surface of the transparent layer 4 of the base material sheet 5 supplied from another roll 26B opposed to the roll 26A, thus laminating a surface protective layer 6.

Furthermore, a method for producing a decorative sheet according to the present invention is characterized by comprising the steps of forming a pattern on one surface 2a of a base material film 2' formed of a colored resin raw material having an amorphous polyethylene terephthalate type resin as a main component, by using a coloring ink comprising a binder including a copolymer of vinyl chloride and vinyl acetate as a main component, thus forming a print pattern layer 3; supplying the base material film 2' between a first pair of rolls 21 which are generally horizontally provided in a parallel manner; supplying a transparent resin film 4' obtained by extruding a transparent resin raw material including an amorphous polyethylene terephthalate type resin as a main component, between one roll 23A of the first pair of rolls 21 and the surface of the print pattern layer 3 of the base material film 2' supplied from another roll 23B opposed to the roll 23A, to laminate and spread the transparent resin film 4' on the print pattern layer 3 of the base material film 2', thus forming a base material sheet 5 in which a transparent layer 4 is formed on the print pattern layer 3 of the base material film 2'; supplying the base material sheet 5 between a second pair of rolls 25; supplying a transfer foil 7 equipped with a surface protective film 10 which is hard and transparent between one roll 26A of the second pair of rolls 25 and the surface of the transparent layer 4 of the base material sheet 5 supplied from another roll 26B opposed to the roll 26A, thus transferring the transfer foil 7 to the surface of the transparent layer 4 of the base material sheet 5; and releasing a base material film 8 of the transfer foil 7.

According to the decorative sheets and the methods for producing the same of the present invention, the base material layer and the transparent layer constituting the decorative sheet are formed of a resin material including an amorphous polyethylene terephthalato type resin as a main component, and the raw material of the print pattern layer for forming a pattern, which is positioned between the base material layer and the transparent layer, is formed of an ink comprising a binder including a copolymer of vinyl chloride and vinyl acetate as a main component. For these reasons, the laminate strength (adhesive strength of the decorative sheet formed of the laminated layers) in each layer of the laminated layers of the base material layer, transparent layer, and print pattern layer can be sufficiently obtained, and therefore, the effects can be exhibited such that unfavorable phenomena, such as separation of each layer, do not occur.

In addition, because of having a sufficient laminate strength, being free from easily separation of each layer, and employing a resin material including an amorphous polyethylene terephthalate type resin as a raw material, the secondary processing properties including, for example, a three-dimensional processing such as an R processing or a curved surface processing, and a membrane formability may be improved, and for this reason, the effects can be exhibited such that a decorative sheet which can be processed into a desired shape can be obtained.

Furthermore, since a print pattern layer is located under the transparent surface protective layer and transparent layer, the effects can be exhibited of having good design properties, that is, moldings with good appearance with a desired shape can be obtained.

In addition, by forming a surface protective layer formed of a transfer protective layer of a transfer foil or formed of a hard coating film on the surface of the decorative sheet, gloss can be afforded on the surface as the decorative sheet, thus improving the design properties, and furthermore, impact resistance, solvent resistance, and abrasion resistance can be improved.

In addition, by spreading a masking film on the surface of the surface protective layer, the masking film can afford the effects such that abrasion marks and the like do not remain on the surface protective layer after transportation of a decorative sheet as a product.

The decorative sheets according to the present invention can be applied to a wide range of use as a decorative sheet which commonly used to adhere to the surfaces of various base materials such as a wooden base material, a metal base material, and the like. For example, a decorative sheet provided with a transfer foil on the surface thereof is subjected to an adhesive processing by means of a membrane molding device as a surface material of a concave-and-convex processed MDF (medium density fiber board), thus being useful as various doors such as doors for use in kitchen. A decorative sheet provided with a hard coating film on the surface thereof exhibits superior abrasion resistance, and for this reason, it is useful as an elevator interior material, a room interior material, a mounting material for use in household electrics such as refrigerator.

DETAILED DESCRIPTION OF THE INVENTION

Figure 1:
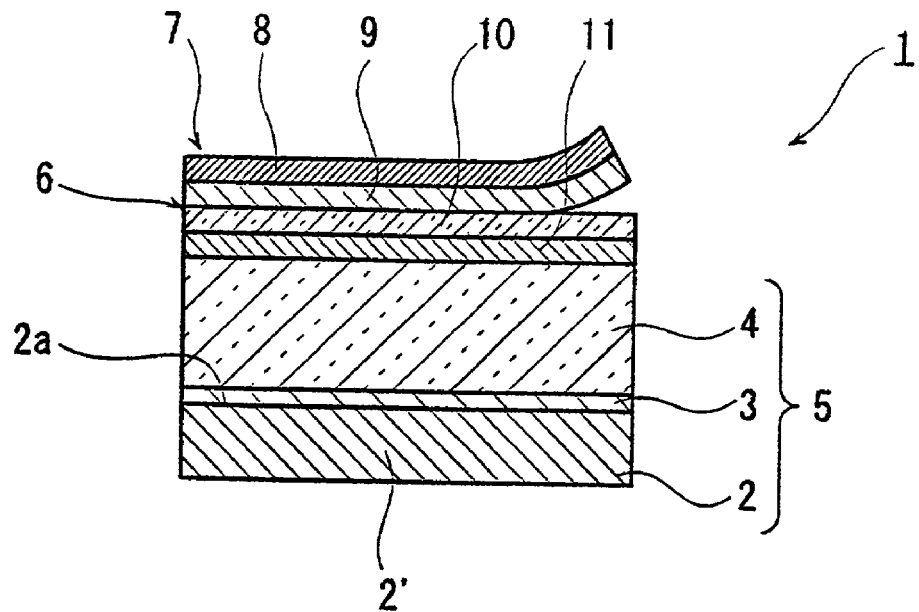
FIG. 1 is a schematic side sectional view showing an embodiment of a decorative sheet according to the present invention.

FIG. 1 is a schematic sectional view showing an embodiment of a decorative sheet according to the present invention.

A decorative sheet 1 of the present embodiment comprises a base material layer 2; a print pattern layer 3; a transparent layer 4; and a surface protective layer 6, as shown in FIG. 1.

The base material layer 2 is formed of a resin material including an amorphous polyethylene terephthalate type resin as a main component, and is obtained by forming a film by means of extrusion molding from the colored resin material. The amorphous polyethylene terephthalate type resin described above as a resin material corresponds to a resin obtained by copolymerization of a dicarboxylic acid component consisting of terephthalic acid and a diol component consisting of 25 to 35% by mole of 1,4-cyclohexanedimethanol and 65 to 75% by mole of ethylene glycol. The film obtained by this resin raw materials exhibits good thermal processing properties such as membrane forming properties, and the like.

In the present embodiment, the print pattern layer 3 is formed by printing various patterns such as a wood grain pattern, a marble pattern, and the like by means of a printing method such as gravure printing with a coloring ink on one surface 2a of the film (base material film 2') obtained by means of extrusion, which forms the base material layer 2 described above. The coloring ink for forming the print pattern layer 3 is formed of a coloring ink comprising a binder including a copolymer of vinyl chloride and vinyl acetate as a main component. As examples of the coloring ink comprising a binder including a copolymer of vinyl chloride and vinyl acetate as a main component, mention may be made of the coloring inks of SX ink series produced by Showa Ink Industry, Co., Ltd., such as "SX257 medium", "SX851 black", "SX157 red", "SX 360 yellow", "SX651 blue", "SX pearl gold", and "SXT008 silver".

The transparent layer 4 is formed of a resin material including an amorphous polyethylene terephthalate type resin as a main component, which is the resin raw material equivalent to those of the base material layer 2 described above and which is a transparent resin raw material. The transparent layer 4 is laminated on the print pattern layer 3 by means of an extrusion laminating method. That is, after the base material film 2' constituting the base material layer 2 described above is obtained, the print pattern layer 3 is formed on one surface 2a of the base material film 2' by means of a gravure printing method or the like, a resin material for forming the transparent layer 4 is extruded in the form of a film on the print pattern layer 3, and at the same time, by passing the extruded film between a pair of rolls, a laminate application is carried out, thus forming the transparent layer 4.

In addition, by forming the print pattern layer 3 and the transparent layer 4 on the base material film 2' for forming the base material layer 2 described above, there is formed a base material sheet 5 having a triple-layered structure wherein a print pattern layer 3 of a coloring ink comprising a binder including a copolymer of vinyl chloride and vinyl acetate as a main component is interleaved between the transparent layer 4 and the base material layer 2, both the layers 2 and 4 being formed of a resin raw material including an amorphous polyethylene terephthalate type resin as a main component.

The resin raw material for the base material layer 2 and the transparent layer 4 may be the amorphous polyethylene terephthalate type resin with an addition of a crystalline polyester resin. The crystalline polyester resin is a common polyethylene terephthalate or a polybutylene terephthalate, and the like. They may be included in a ratio of 40 to 100% by weight of the amorphous polyethylene terephthalate type resin and 0 to 60% by weight and preferably 10 to 40% by weight of the crystalline polyester resin. By adding the crystalline polyester resin, the base material layer 2 and transparent layer 4 can have an improved solvent resistance.

In addition, the surface protective layer 6 corresponds to a surface protective film formed of a resin raw material which is hard and transparent, and is laminated on the transparent layer 4 of the base material sheet 5. The surface protective film for forming the surface protective layer 6 consists of a transfer protective layer 10 of a transfer foil 7 or consists of a hard coating film.

The transfer foil 7 constituted as a surface protective film for forming the surface protective layer 6 corresponds to a film having a four-layered structure in which a polyethylene terephthalate (PET) resin is employed as a base material film 8; on one surface of the base material film 8, a releasing layer 9 is smoothly laminated; a transfer protective layer 10 having a thickness of several $\mu$m to ten and several $\mu$m by forming a coat with an application of a resin having high transparency, good glossiness, and high hardness, formed of an acryl type resin, such as a thermoplastic resin by means of a roll coating method; and a hot-melt-type adhesive is applied to the transfer protective layer 10, thus forming an adhesive layer 11. In the case of the transfer foil 7, transferring is carried out by means of a transfer roll on the transparent layer 4 of the base material sheet 5 described above, the base material film 8 after completion of transferring is released at the part of the releasing layer 9, thus producing a decorative sheet 1 as a product. The transfer foil 7 preferably has a surface hardness ranging from H to 2H expressed by a pencil hardness.

As examples of the transfer foil 7, mention may be made of the products "TSF-H-01", "TSF-UA-02", "TSF-M-03", "TSF-M-04", "TSF-ME-14", "TSF-ME-15", and the like, produced by Kyoto Nakai Shoji Co., Ltd.

The decorative sheet provided with the transfer foil 7 has an advantage in that a three-dimensional molding can be carried out. However, the base material film 8 cannot be subjected to a three-dimensional molding by means of a membrane press molding machine, a vacuum molding machine, and the like, and for this reason, it is preferable that the base material film 8 be replaced with a masking film which can be subjected to a three-dimensional molding, for protection during molding.

Figure 2:
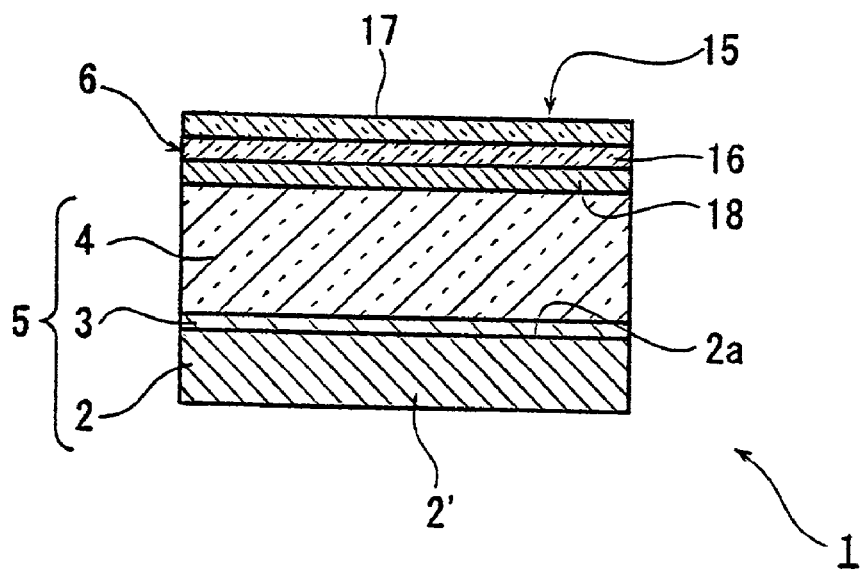
FIG. 2 is a schematic side sectional view showing another embodiment of a decorative sheet according to the present invention.

In addition, the hard coating film 15 constituted as a surface protective film for forming the surface protective layer 6 is formed, as shown in FIG. 2, by applying an electron-beam hardenable resin or an ultraviolet hardenable resin such as a hardenable acryl type resin on the surface of a smooth bi-axial-drawn base film 16 formed of a crystalline polyethylene terephthalate resin, by means of a roll coating method, thus forming a hard coating layer 17. On the other hand, by applying a hot-melt-type adhesive to the rear surface of the base film 16, an adhesive layer 18 may be formed. In the case of the hard coating film 15, the application on the transparent layer 4 of the base material sheet 5 described above is carried out by means of a dry laminating method, thus forming a decorative sheet 1 as a product. The hard coating film 15 preferably has a surface hardness ranging from 4H to 6H expressed by a pencil hardness.

As examples of the hard coating film 15, mention may be made of the product "VHN-U03", produced by Kyoto Nakai Shoji Co., Ltd. In addition, the product "VHC-U heat seal" produced by Kyoto Nakai Shoji Co., Ltd., in which a hot-melt adhesive layer is provided on the rear surface, also can be employed.

The decorative sheet provided with the hard coating film 15 has an advantage in that it has the superior hardness as compared to those using the transfer foil. However, the film formed of a polyethylene terephthalate resin is employed as a base material film, and for this reason, a three-dimensional molding cannot be carried out. However, a two-dimensional bending processing (R processing) can be carried out.

In addition, on the surface of the surface protective layer 6, a masking film formed of an adhesive film such as a polyethylene resin may be spread, although it is not shown in the drawings. By using the masking film, abrasion and the like may not left on the surface protective layer 6 during transportation of a decorative sheet 1 as a product. The masking film is commonly formed by providing a releasable weak adhesive layer on the base material film formed of an olefin type resin. As examples of the masking film, mention may be made of the product "SPV-C100" produced by Nitto Denko Co., Ltd.

Figure 3:
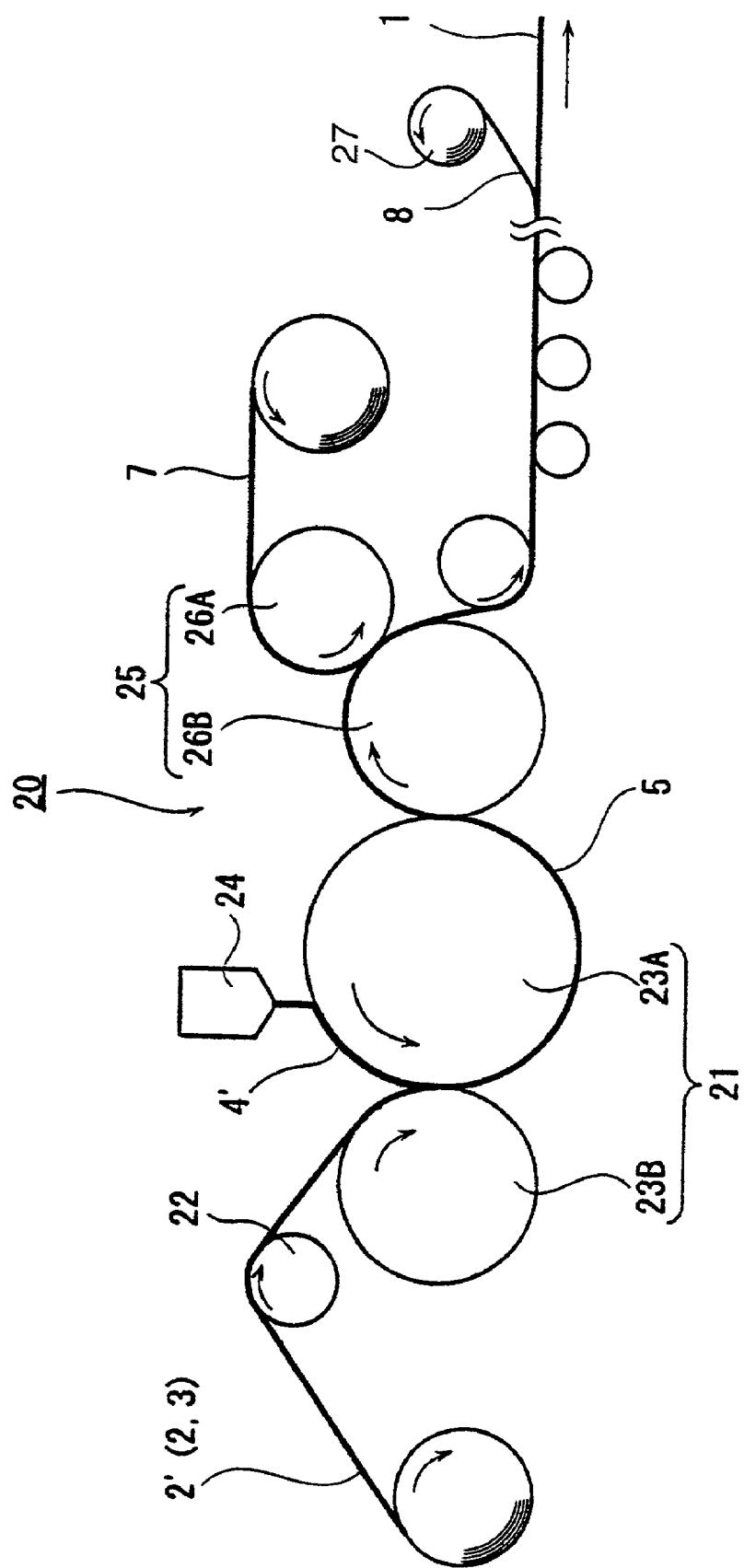
FIG. 3 is a schematic view showing a manufacturing apparatus employed in a method for producing the decorative sheet according to the present invention.

In the following, a method for producing the decorative sheet 1 having the constructions described above will be explained using a schematic view of a device 20 of producing a sheet as shown in FIG. 3. As described above, the surface protective layer 6 of the decorative sheet 1 has one mode comprising a transfer protective layer 10 of a transfer foil 7 and another mode comprising a hard coating film 15. Here, a production method in the case in which the surface protective layer 6 is constituted of a transfer protective layer 10 of a transfer foil 7 will be explained as an example.

First, a base material film 2' is produced using a colored resin raw material including an amorphous polyethylene terephthalate type resin as a main component, by means of an extrusion molding method and the like so that the film has a generally uniform prescribed thickness, for example, 100 $\mu$m.

Figure 4A:
FIGS. 4A to 4D are side sectional views showing the production steps of the decorative sheet according to the present invention.

Next, on one surface 2a of the base material film 2', a desirable pattern such as a wood grain pattern, a marble pattern, and the like is formed by means of a printing method such as gravure printing with a coloring ink comprising a binder including a copolymer of vinyl chloride and vinyl acetate as a main component, thus forming a print pattern layer 3 (see FIG. 4A). The base material film 2' on which the print pattern layer 3 is formed is rolled in the form of a roll. In the present embodiment, the film 2' is rolled so that the print pattern layer 3 is present on the surface of the film 2'.

Subsequently, the base material film 2' in the form of a roll is set in the device 20 for producing a sheet as shown in FIG. 3. In the device 20 for producing a sheet, the tip of the base material film 2' in the form of a roll is supplied between a first pair of rolls 21 which are generally horizontally provided in a parallel manner. As shown in FIG. 3, in the present embodiment, the base material film 2' is supplied from the upper side of the first pair of rolls 21 via a support roll 22. The supplying direction of the base material film 2' during the supplying step is proceeded so that the surface which the print pattern layer 3 is formed on is directed to the side of the cast roll 23A which is another roll opposed to the roll 23B which the base material film 2' is rolled on.

In addition, at the same time as supplying the base material film 2', a transparent resin raw material including an amorphous polyethylene terephthalate type resin as a main component is extruded in the form of a film by means of a melt-extrusion method from a die 24 of an extruder (not shown) located on the upper side of the cast roll 23A.

Figure 4B:
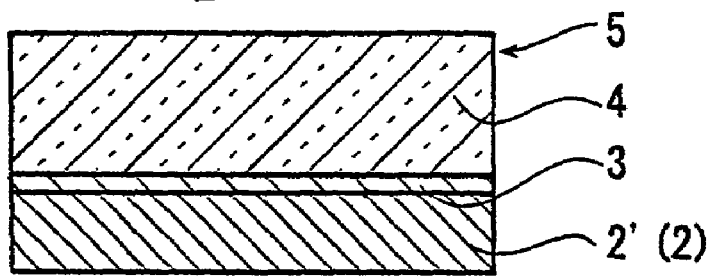

The extruded transparent resin film 4' is fed in the vertically lower direction, is moved along with the surface of the cast roll 23A and is supplied between the cast roll 23A and the other roll 23B, so that the transparent resin film 4' is supplied between the first pair of rolls 21 with the base material film 2'. That is, on the print pattern layer 3 of the base material film 2', the transparent resin film 4' is laminated by extrusion, thereby forming the transparent layer 4 on the print pattern layer 3. In addition, by passing them between the first pair of rolls 21, a base material sheet 5 is formed (see FIG. 4B).

Subsequently, the base material sheet 5 formed by means of the first pair of rolls 21 described above is supplied between a second pair of rolls 25 which are provided in a parallel manner with respect to the first pair of rolls 21. In the second pair of rolls 25, one roll corresponds to a transfer roll 26A and the other roll 26B is provided adjacent to the cast roll 23A of the first pair of rolls. That is, between the cast roll 23A and the roll 26B of the second pair of rolls, the base material sheet 5 is moved in an upper direction, and is subsequently supplied between the roll 26B and the transfer roll 26A.

In the base material sheet 5 between the second pair of rolls 25, the transparent layer 4 is faced to the transfer roll 26A. Between the surface of the transparent layer 4 and the transfer roll 26A, a transfer foil 7 is supplied.

Figure 4C:
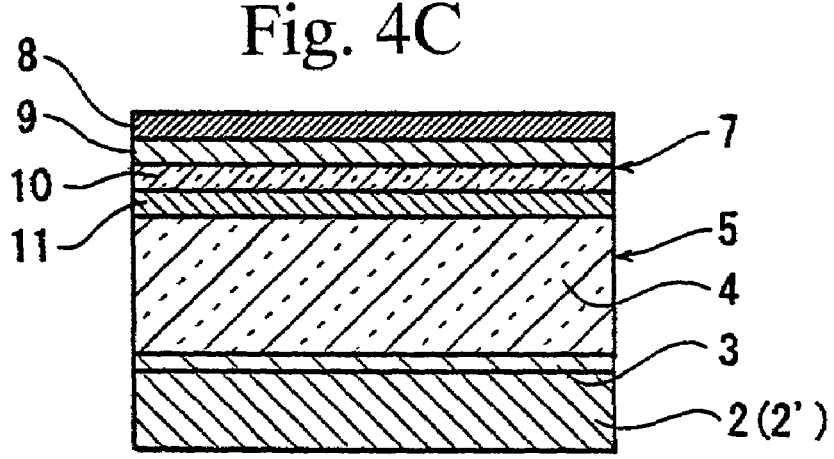

The supplied transfer foil 7 is preliminarily set in the device in a rolled manner, as shown in FIG. 3. An adhesive layer 11 is supplied so that the adhesive layer 11 is opposed to the transparent layer 4 of the base material sheet 5. Between the rolls 25 described above, the transfer foil 7 is spread and transferred to the transparent layer 4 of the base material sheet 5 by a hot-melt adhesive of the adhesive layer 11 (see FIG. 4C).

Figure 4D:
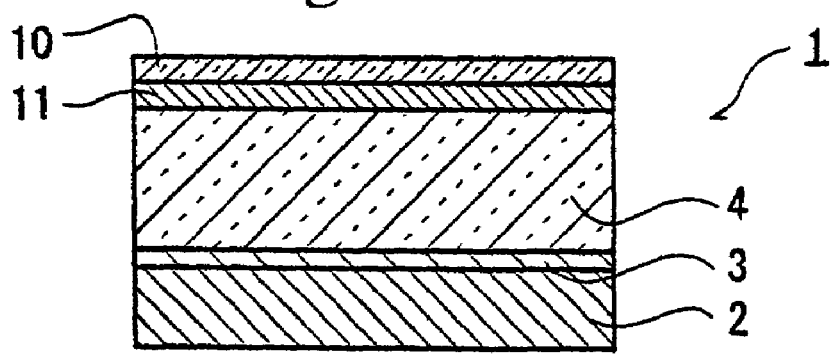

Subsequently, the base material sheet 5 in which the transfer foil 7 is transferred is carried and, as shown in FIG. 3, the base material film 8 of the transfer foil 7 is released at the position of the releasing layer 9 and is wound by means of a winding roll 27. By releasing the base material film 8 and the releasing layer 9, a decorative sheet 1 in which a transfer protective layer 10 is laminated on the base material sheet 5 is produced (see FIG. 4D).

On the surface of the transfer protective layer 10 which corresponds to the surface of the decorative sheet 1, a masking film may be spread in order to prevent the surface abrasion, although the masking film is not shown in the drawings. In this case, a step for spreading a masking film is additionally provided.

Therefore, according to the decorative sheet 1 obtained by the production method described above, the base material layer 2 and the transparent layer 4 constituting the decorative sheet 1 are formed of a resin raw material including an amorphous polyethylene terephthalate type resin as a main component. For this reason, the secondary processing properties including, for example, a three-dimensional processing such as an R processing or a curved surface processing, and a membrane formability may be improved. In addition, the print pattern layer 3 formed between the base material layer 2 and the transparent layer 4 is formed of an ink comprising a binder including a copolymer of vinyl chloride and vinyl acetate as a main component. For this reason, the laminate strength in the base material layer 2 and the transparent layer 4 can be sufficiently obtained, and therefore, unfavorable phenomena, such as separation, do not occur.

Furthermore, by forming the surface protective layer 6, which is thin, on the surface of the decorative sheet 1, gloss can be afforded on the surface as the decorative sheet, and furthermore, solvent resistance, abrasion resistance, and impact resistance can be improved.

In addition, in the case in which the surface protective layer 6 is constituted of a transfer protective layer 10 of a transfer foil 7, sufficient moldability can be obtained. For this reason, the secondary processing can be easily carried out, and a three-dimensional processing such as an R processing or a curved surface processing can be carried out in order to obtain a desirable shape.

Furthermore, in the case in which the surface protective layer 6 is constituted of a hard coating film 15, it is suitable for use in planar use, including, for example, a two-dimensional use, so that the decorative sheet may be spread on a wall.

In addition, the print pattern layer 3 can be seen through the surface protective layer 6 and the transparent layer 4. For this reason, design properties can be obtained.

EXAMPLES

In the following, specific Examples of the decorative sheets will be explained in detail.

Example 1

On one surface of a base material film having a thickness of 100 μm, molded by means of an extrusion method using a brown-colored amorphous polyethylene terephthalate type resin (manufactured by Eastman Chemical Co., Ltd., tradename "PETG6763", a copolymer of diol components: 30% by mole of cyclohexane dimethanol and 70% by mole of ethylene glycol, and a dicarboxylic acid component: terephthalic acid) as a raw material, a wood grain pattern is formed by means of a gravure printing by using a coloring ink comprising a binder including a copolymer of vinyl chloride and vinyl acetate, thus forming a printing pattern layer.

Subsequently, a transparent resin film having a thickness of 200 μm is molded by extrusion by means of an extruder using a transparent resin raw material formed of a composition consisting of 60 parts by weight of an amorphous polyethylene terephthalate type resin, which is the raw material equivalent to those of the base material film described above, (produced by Eastman Chemical Co., Ltd., tradename "PETG6763") and 40 parts by weight of a crystalline polyester type resin (produced by Polyplastic Co., Ltd., tradename "Geranex 600FP", polybutylene terephthalate type resin). The obtained transparent film is laminated by extrusion on the print pattern layer of a wood grain pattern formed on one surface of the base material film described above to form a transparent layer, thus producing a base material sheet.

In addition, to the upper surface of the transparent layer, a transfer foil having a transfer protective layer in the form of a film, formed of a transparent hard resin is transferred. Subsequently, the base material film of the transfer foil is released, thus yielding a decorative sheet formed of a polyester type resin.

The decorative sheet of Example 1 exhibited sufficient laminate strength in each of the laminated layers, and had good membrane moldability.

Example 2

On one surface of a base material film having a thickness of 100 μm, formed of a white amorphous polyethylene terephthalate type resin (manufactured by Eastman Chemical Co., Ltd., tradename "PETG6763"), a marble pattern is formed by means of a color gravure printing by using a coloring ink comprising a binder including a copolymer of vinyl chloride and vinyl acetate, thus forming a printing pattern layer.

Subsequently, a transparent resin film having a thickness of 200 μm is molded by extrusion by means of an extruder using an amorphous polyethylene terephthalate type resin, which is the raw material equivalent to those of the base material film described above, (produced by Eastman Chemical Co., Ltd., tradename "PETG6763"). The obtained transparent resin film is laminated by extrusion on the print pattern layer of a marble pattern to form a transparent layer, thus producing a base material sheet.

In addition, to the upper surface of the transparent layer, a transfer foil having a transfer protective layer in the form of a film, formed of a transparent hard resin is transferred. Subsequently, the base material film of the transfer foil is released, thus yielding a decorative sheet formed of a polyester type resin.

The decorative sheet of Example 2 exhibited sufficient laminate strength in each of the laminated layers, and had good membrane moldability.

Example 3

On one surface of a brown base material film having a thickness of 100 μm, molded by means of an extrusion method using a composition consisting of 80 parts by weight of an amorphous polyethylene terephthalate type resin (manufactured by Eastman Chemical Co., Ltd., tradename "PETG6763") and 20 parts by weight of a crystalline polyester type resin (manufactured by Polyplastic Co., Ltd., tradename "Geranex 600 KP", a polybutylene terephthalate type resin consisting of a diol component: 100% by mole of butylene glycol, and dicarboxylic acid components: 75% by mole of terephthalic acid and 25% by mole of isophthalic acid), with an addition of brown pigments, a wood grain pattern is formed by means of a color gravure printing by using a coloring ink comprising a binder including a copolymer of vinyl chloride and vinyl acetate, thus forming a printing pattern layer.

Subsequently, a transparent resin film having a thickness of 200 μm is molded by extrusion by means of an extruder using the raw material equivalent to those of the base material film described above. The obtained transparent resin film is laminated by extrusion on the print pattern layer of a wood grain pattern which is formed on one surface of the base material film described above to form a transparent layer, thus producing a base material sheet.

In addition, to the upper surface of the transparent layer, an adhesive layer of hard coating film is mounted, thus producing a decorative sheet formed of a polyester type resin.

The decorative sheet of Example 3 exhibited sufficient laminate strength in each of the laminated layers, in the same manner as described in Examples 1 and 2, exhibited good surface hardness, and had good bending such as an R processing.

In Examples 1 to 3 described above, a so-called extrusion laminating method was employed, in which printing is carried out on the preliminarily molded film, and subsequently, a transparent layer (amorphous polyester type resin) is laminated thereon by extrusion. As another method, a heat laminating method may be employed, in which the printed film described above and a preliminarily molded transparent film (amorphous polyester type resin) are laminated by pressing in turn on a big heating drum which is equipped in a heat laminator device.

Comparative Example 1

On one surface of a base material film having a thickness of 100 μm, formed by using the raw material equivalent to those of the base material film of Example 1, that is, a brown-colored amorphous polyethylene terephthalate type resin, a wood grain pattern is formed by using a coloring ink having an acrylic type resin as a binder, according to Comparative Example 1, thus forming a printing pattern layer. In addition, by using an amorphous polyethylene terephthalate type resin, which is the raw material equivalent to those of the transparent layer of Example 1, a transparent layer is laminated by extrusion on the print pattern layer in the same manner as described in Example 1, thus producing a base material sheet. Subsequently, to the transparent layer of the base material sheet, a transfer foil is transferred. The base material film of the transfer foil is released, thereby producing a decorative sheet.

The decorative sheet of Comparative Example 1 could not obtain sufficient laminate strength between the base material film and the transparent layer, and in addition, partial release occurred during membrane molding.

Comparative Example 2

On one surface of a base material film having a thickness of 100 μm, formed by using the raw material equivalent to those of the base material film of Example 1, that is, a brown-colored amorphous polyethylene terephthalate type resin, a wood grain pattern is formed by using an ink having an urethane resin as a binder, according to Example 2, thus forming a printing pattern layer. In addition, by using an amorphous polyethylene terephthalate type resin, which is the raw material equivalent to those of the transparent layer of Example 1, a transparent layer is laminated by extrusion on the print pattern layer in the same manner as described in Example 1, thus producing a base material sheet. Subsequently, to the transparent layer of the base material sheet, a transfer foil is transferred. The base material film of the transfer foil is released, thereby producing a decorative sheet.

The decorative sheet of Comparative Example 2 could not obtain sufficient laminate strength between the base material film and the transparent layer, and in some cases, partial release occurred during membrane molding, in the same manner as Comparative Example 1.

What is claimed is:

1. A decorative sheet comprising:
a base material layer formed of a colored resin material including a resin obtained by copolymerization of a dicarboxylic acid component consisting of terephthalic acid and a diol component consisting of 1,4-cyclohexanedimethanol and ethylene glycol as a main component;
a print pattern layer formed on one surface of said base material layer, consisting of a coloring ink comprising a binder including a copolymer of vinyl chloride and vinyl acetate as a main component;
a transparent layer laminated on said print pattern layer, consisting of a resin material including a transparent resin obtained by copolymerization of a dicarboxylic acid component consisting of terephthalic acid and a diol component consisting of 1,4-cyclohexanedimethanol and ethylene glycol as a main component; and
a hard coating film, laminated on said transparent layer, consisting of a base film of a crystalline polyethylene terephthalate resin, an adhesive layer formed by applying a hot-melt-type adhesive to the rear surface of the base film for attaching the transparent layer to the hard coating film, and a hard coating layer of a hardenable resin formed on the surface of the base film.

2. A decorative sheet comprising:
a base material layer formed of a colored resin material including a resin obtained by copolymerization of a dicarboxylic acid component consisting of terephthalic acid and a diol component consisting of 1,4-cyclohexanedimethanol and ethylene glycol as a main component;
a print pattern layer formed on one surface of said base material layer, consisting of a coloring ink comprising a binder including a copolymer of vinyl chloride and vinyl acetate as a main component;
a transparent layer laminated on said print layer, consisting of a resin material including a transparent resin obtained by copolymerization of a dicarboxylic acid component consisting of terephthalic acid and a diol component consisting of 1,4-cyclohexanedimethanol and ethylene glycol as a main component; and
a transfer foil laminated on said transparent layer, formed of a base material film of a polyethylene terephthalate resin, a releasing layer laminated on one surface of the base material film, a transfer protective layer formed on the releasing layer, and an adhesive layer formed of a hot-melt-type adhesive on the transfer protective layer for attaching the transparent layer to the transfer foil.

3. A decorative sheet comprising:
a base material formed of a colored resin material including a resin obtained by copolymerization of a dicarboxylic acid component consisting of terephthalic acid and a diol component consisting of 1,4-cyclohexanedimethanol and ethylene glycol as a main component;
a print pattern layer formed on one surface of said base material layer, consisting of a coloring ink comprising a binder including a copolymer of vinyl chloride and vinyl acetate as a main component;
a transparent layer laminated on said print pattern layer, consisting of a resin material including a transparent resin obtained by copolymerization of a dicarboxylic acid component consisting of terephthalic acid and a diol component consisting of 1,4-cyclohexanedimethanol and ethylene glycol as a main component;
a hard coating film laminated on said transparent layer, consisting of a base film of a crystalline polyethylene terephthalate resin, a first adhesive layer formed by applying a hot-melt-type adhesive to the rear surface of the base film for attaching the transparent layer to the hard coating film, and a hard coating layer of a hardenable resin formed on the surface of the base film; and
a transfer foil laminated on said hard coating film, formed of a base material film of a polyethylene terephthalate resin, a releasing layer laminated on one surface of the base material film, a transfer protective layer formed on the releasing layer, and a second adhesive layer formed of a hot-melt-type adhesive on the transfer protective layer for attaching the hard coating film to the transfer foil.

* * * * *